(No Model.)

J. W. KLETT.
FOOD HOLDER FOR BIRD CAGES.

No. 350,310. Patented Oct. 5, 1886.

WITNESSES:
Harry Frease
Chas. R. Miller

INVENTOR
John W Klett
BY
W K Miller
ATTORNEY

UNITED STATES PATENT OFFICE.

JOHN W. KLETT, OF CANTON, OHIO.

FOOD-HOLDER FOR BIRD-CAGES.

SPECIFICATION forming part of Letters Patent No. 350,310, dated October 5, 1886.

Application filed April 21, 1886. Serial No. 199,626. (No model.)

*To all whom it may concern:*

Be it known that I, JOHN W. KLETT, a citizen of the United States, and a resident of Canton, county of Stark, State of Ohio, have invented a new and useful Improvement in Food-Holders for Bird-Cages, of which the following is a full, clear, and exact description, reference being had to the accompanying drawings, making part of this specification.

My invention relates to and consists in providing means for holding cuttle-bone and food for birds in cages; and it consists in providing means for attaching and holding the bone-holding clamp to the cage, also in providing a clamp, as hereinafter set forth and described.

My invention also relates to and consists of the detail and combination of parts, as described and set forth in the claim.

Figure 1:
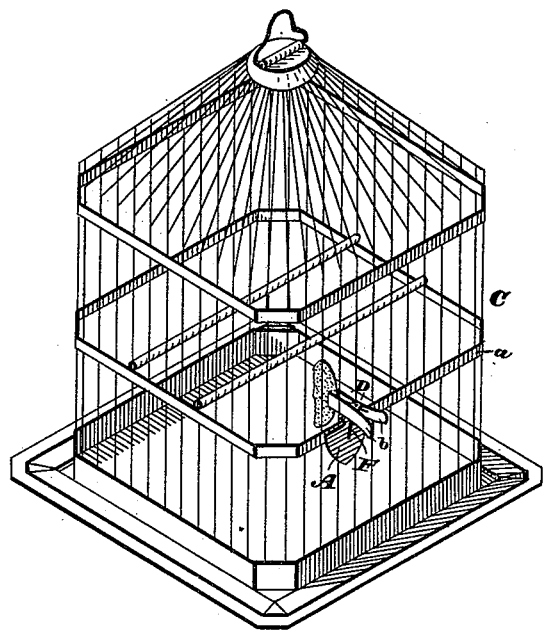
Figure 3:
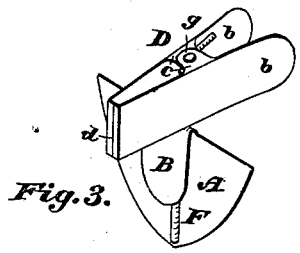
Figure 2:
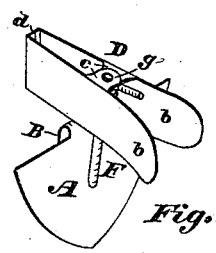
Figure 4:
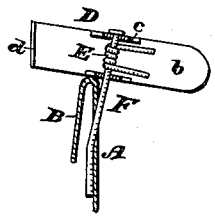

Figure 1 is a view showing the holder as applied to a cage. Fig. 2 is an isometrical view of the holder disconnected from the cage, showing an upper and outside view. Fig. 3 is same view showing an upper and inside view of the holder. Fig. 4 is a sectional view showing the shield in cross-section, the inner face of the right-hand jaw, the coil-spring, and supporting-pin.

Similar letters of reference indicate corresponding parts in all the figures of the drawings.

The body part A is cut from sheet metal, and may be in the form of a shield, as shown, having a tongue extending out from its upper edge. This tongue is bent over and down on the inner face of the shield, forming a hook, B, by which the shield may be held and supported on the cage C, as shown in Fig. 1, the hook B passing down on the inside of and resting against the bar *a*. The plates *b*, forming the clamping-jaws D, are also cut from sheet metal, and are formed with wings *c*, projecting from the side edges at about the middle of the piece. The said wings are perforated and bent over to a line at right angles with the body of the plate *b*. One end, *d*, of each plate *b* is turned in to form a biting-edge, which may have teeth, if desired. The other end of the plate may be cut and formed into any desirable design. A coil-spring, E, as shown in Fig. 4, is provided, the free ends of which rest against the finger ends of the clamping-jaws. When the clamping-jaws are put together, as shown in Fig. 2, having the wings *c* lapping over, so as to bring the perforations *g* in line, the spring E resting between the lugs, as shown in Fig. 4, the supporting-pin F may be passed through the perforations *g*, and through the spring E and plate A to the inside, as shown in Fig. 4, in which position it may be soldered, thus securely holding the parts all in working position, the jaws resting on the top of the hook B or the plate A, and head of the pin F resting against the upper wing *c* of the clamping-jaw.

The operation and use of my invention is as follows: Press the finger ends of the jaws together, place a piece of cuttle-bone or other food in the jaw, and pass the food and jaw through between the vertical wires to the inside of the cage, and press the clasping-hook down over the bar *a*, as shown in Fig. 1.

By the use of my invention small pieces of bone or food may be placed in the cage, occupying less of the room of the cage, and is a more cleanly and economical method of supplying such food as may be so held to the bird in the cage.

Having thus fully described the nature and object of my invention, what I claim as new, and desire to secure by Letters Patent, is—

As a new article of manufacture, a food-holder for a bird-cage having a plate, A, provided with a hook, B, supporting-pin F, spring E, and clamping-jaws D, substantially as described, and for the purpose set forth.

In testimony whereof I have hereunto set my hand this 17th day of April A. D. 1886.

JOHN W. KLETT.

Witnesses:
W. K. MILLER,
CHAS. R. MILLER.